US012305590B2

(12) United States Patent
Sato et al.

(10) Patent No.: US 12,305,590 B2
(45) Date of Patent: May 20, 2025

(54) SPINY LINER AND MANUFACTURING METHOD OF SAME, AND METHOD OF DETERMINING BONDING STRENGTH

(71) Applicants: TPR Industry Co., Ltd., Yamagata (JP); TPR Co., Ltd., Tokyo (JP)

(72) Inventors: Akira Sato, Yamagata (JP); Takashi Sato, Yamagata (JP); Kiyoyuki Kawai, Tokyo (JP)

(73) Assignees: TPR Industry Co., Ltd., Yamagata (JP); TPR Co., Ltd., Tokyo (JP)

( * ) Notice: Subject to any disclaimer, the term of this patent is extended or adjusted under 35 U.S.C. 154(b) by 351 days.

(21) Appl. No.: 17/439,433

(22) PCT Filed: Jun. 18, 2020

(86) PCT No.: PCT/JP2020/023956

§ 371 (c)(1),
(2) Date: Sep. 15, 2021

(87) PCT Pub. No.: WO2021/255890

PCT Pub. Date: Dec. 23, 2021

(65) Prior Publication Data

US 2022/0307443 A1 Sep. 29, 2022

(51) Int. Cl.
*F02F 1/00* (2006.01)

(52) U.S. Cl.
CPC .......... *F02F 1/004* (2013.01); *F02F 2200/00* (2013.01)

(58) Field of Classification Search
CPC ...... F02F 1/004; F02F 2200/00; B22D 15/02; B22D 19/0009; B22D 19/08;
(Continued)

(56) References Cited

U.S. PATENT DOCUMENTS

| | | | |
|---|---|---|---|
| 2005/0161187 A1 | 7/2005 | Kodama et al. | |
| 2007/0012178 A1 | 1/2007 | Takami et al. | |

(Continued)

FOREIGN PATENT DOCUMENTS

| | | | |
|---|---|---|---|
| CN | 212744165 U | 3/2021 | |
| EP | 3805545 A1 * | 4/2021 | ......... B22D 19/0009 |

(Continued)

OTHER PUBLICATIONS

Machine translation of JP6510743 Sato et al. Obtained from EPO on Oct. 27, 2023. (Year: 2019).*

(Continued)

*Primary Examiner* — Megha M Gaitonde
(74) *Attorney, Agent, or Firm* — MARSHALL, GERSTEIN & BORUN LLP

(57) ABSTRACT

Provided is a spiny liner that may further improve bonding strength when being integrated with metal on the outer peripheral surface side. The spiny liner includes a plurality of projections including constricted projections on the surface. Denoting the number of constricted projections per 100 mm2 out of the projection by Pc, the average height of projections by h (mm), and the average of maximum thicknesses and the average of minimum thicknesses of any 20 projections out of the constricted projections by dw (mm) and dn (mm), respectively, the total value of (I) and (II) below is 1.55 or more.

$$(I)=Pc\times[(0.35h\pi/12)\times(2dw^2-dw\times dn-dn^2)]$$

$$(I)=Pc\times\{(dn^2/4)\times r\times 0.35h\}$$

7 Claims, 5 Drawing Sheets

(58) Field of Classification Search
CPC ..... Y10T 428/24479; Y10T 428/24612; Y10T 428/24942; Y10T 428/2495
USPC ................................ 428/156, 172, 212, 213
See application file for complete search history.

(56) References Cited

U.S. PATENT DOCUMENTS

| | | | |
|---|---|---|---|
| 2007/0240652 | A1 | 10/2007 | Michioka et al. |
| 2009/0272261 | A1 | 11/2009 | Sato et al. |
| 2012/0304852 | A1 | 12/2012 | Yamagata et al. |
| 2019/0358701 | A1 | 11/2019 | Sayama et al. |
| 2020/0392921 | A1 | 12/2020 | Sato et al. |

FOREIGN PATENT DOCUMENTS

| | | | | |
|---|---|---|---|---|
| JP | 2003-326353 | A | 11/2003 | |
| JP | 2005-194983 | A | 7/2005 | |
| JP | 2007-016733 | A | 1/2007 | |
| JP | 2009-264347 | A | 11/2009 | |
| JP | 2011-194407 | A | 10/2011 | |
| JP | 6510743 | B1 * | 5/2019 | ......... B22D 19/0009 |
| WO | WO-2019/097678 | A1 | 5/2019 | |
| WO | WO-2019/225038 | A1 | 11/2019 | |

OTHER PUBLICATIONS

Office Action in CN Application No. 202010815597.0 dated Apr. 29, 2022, 12 pages.
Search Report and Written Opinion in International Application No. PCT/JP2020/023956 dated Aug. 18, 2020, 7 pages.

* cited by examiner

SPINY LINER AND MANUFACTURING METHOD OF SAME, AND METHOD OF DETERMINING BONDING STRENGTH

TECHNICAL FIELD

The present invention relates to a spiny liner including newly shaped projections on the surface, a method of manufacturing the spiny liner, a method of determining bonding strength, and a spiny liner being given information about bonding strength.

BACKGROUND ART

The cast-iron cylindrical member is used as a cylinder liner of an internal combustion engine, a brake drum of an internal-expanding drum brake, a bearing member or a support member, or the like.

A cast-iron cylindrical member is insert-cast with a metal material on the outer peripheral surface, and the metal on the outer peripheral side and the cast iron cylindrical member are integrated. In order to maintain the bonding strength when integrated, a plurality of projections is provided on the outer peripheral surface of the cast-iron cylindrical member (see, for example, Patent Literature 1 and 2).

In terms of projections on the outer peripheral surface of a cast-iron cylindrical member, the projections being provided in order to keep bonding strength in integration, a technology of providing excellent bonding strength by using a cast-iron member with a certain anchor part index or greater focusing on a constricted shape of the projection has been proposed (see Patent Literature 3).

CITATION LIST

Patent Literature

[Patent Literature 1] Japanese Patent Application Laid-Open No. 2005-194983
[Patent Literature 2] Japanese Patent Application Laid-Open No. 2009-264347
[Patent Literature 3] Japanese Patent No. 6510743

SUMMARY OF INVENTION

Problems to be Solved by the Invention

Aforementioned Patent Literature 3 focuses on a constricted shape of a projection and is based on knowledge that a part of a projection between the maximum thickness and the minimum thickness (hereinafter also referred to as an anchor part) greatly contributes to bonding strength. However, bonding strength in integration with metal on the outer peripheral surface side may not become sufficient merely by focusing on the anchor part, and there is room for further improvement. A problem addressed by the present invention is to provide a spiny liner being an insert-cast cylinder liner, including projections on the surface, and further being a spiny liner including, on the surface, newly shaped projections that may further improve bonding strength in integration with metal on the outer peripheral surface side.

Means for Solving the Problems

The present inventors have proceeded with examinations in order to solve the aforementioned problem and have found that, by controlling the shape of a projection in consideration of strength of each projection itself, that is, the minimum thickness value of the projection, in addition to the anchor part of the projection, the aforementioned problem can be solved. Further, the present inventors have also found that bonding strength in integration can be determined by applying the knowledge.

An embodiment of the present invention is a spiny liner including a plurality of projections including one or a plurality of constricted projections on a surface, wherein, denoting the number of constricted projections per 100 $mm^2$ out of the projections by Pc, an average height of projections by h (mm), and an average of maximum thicknesses and an average of minimum thicknesses of any 20 projections out of the constricted projections by dw (mm) and dn (mm), respectively, a total value of (I) and (II) below is 1.55 or more.

$$(I)=Pc\times[(0.35h\pi/12)\times(2dw^2-dw\times dn-dn^2)]$$

$$(II)=Pc\times\{(dn^2/4)\times\pi\times0.35h\}$$

The dw/dn value is preferably 1.1 or more and 1.6 or less, the (I) value is preferably 0.25 or more, and the (II) value is preferably 1.35 or more.

Another embodiment of the present invention is a method of determining bonding strength of a complex acquired when a spiny liner including one or a plurality of projections on a surface is joined to a cylinder block, the determination method including a determination step of determining whether a total value of (I) and (II) below is 1.55 or more with respect to projections on a surface of the spiny liner.

Method of calculating values of (I) and (II);

Denoting the number of one or a plurality of constricted projections per 100 mm2 by Pc, an average height of projections by h (mm), and an average of maximum thicknesses and an average of minimum thicknesses of any 20 projections out of the constricted projections by dw (mm) and dn (mm), respectively, (I) and (II) below are calculated.

$$(I)=Pc\times[(0.35h\pi/12)\times(2dw^2-dw\times dn-dn^2)]$$

$$(II)=Pc\times\{(dn^2/4)\times\pi\times0.35h\}$$

Further, another embodiment of the present invention is a method of manufacturing a spiny liner, wherein the method includes a preparation step of preparing a spiny liner;

a determination step of determining bonding strength of a prepared spiny liner by the method described above; and a selection step of selecting a spiny liner having a total value of (I) and (II) in a determination step being 1.55 or more.

Furthermore, another embodiment of the present invention is a spiny liner including one or a plurality of projection on a surface, wherein the spiny liner is given information about bonding strength of a complex acquired when the spiny liner is joined to a cylinder block, and the information is preferably given directly to a spiny liner, provided on a packaging body of a spiny liner directly or through a medium, or provided by a medium packaged with a spiny liner.

Effects of the Invention

The present invention can provide a spiny liner that may further improve bonding strength when being integrated with metal on the outer peripheral surface side. The spiny liner is suitably used in casting based on die casting. Further, bonding strength when the spiny liner and the metal on the outer peripheral surface side are integrated can be determined. Furthermore, a spiny liner being given information about bonding strength when being integrated with the metal on the outer peripheral surface side can be provided.

Figure 3:
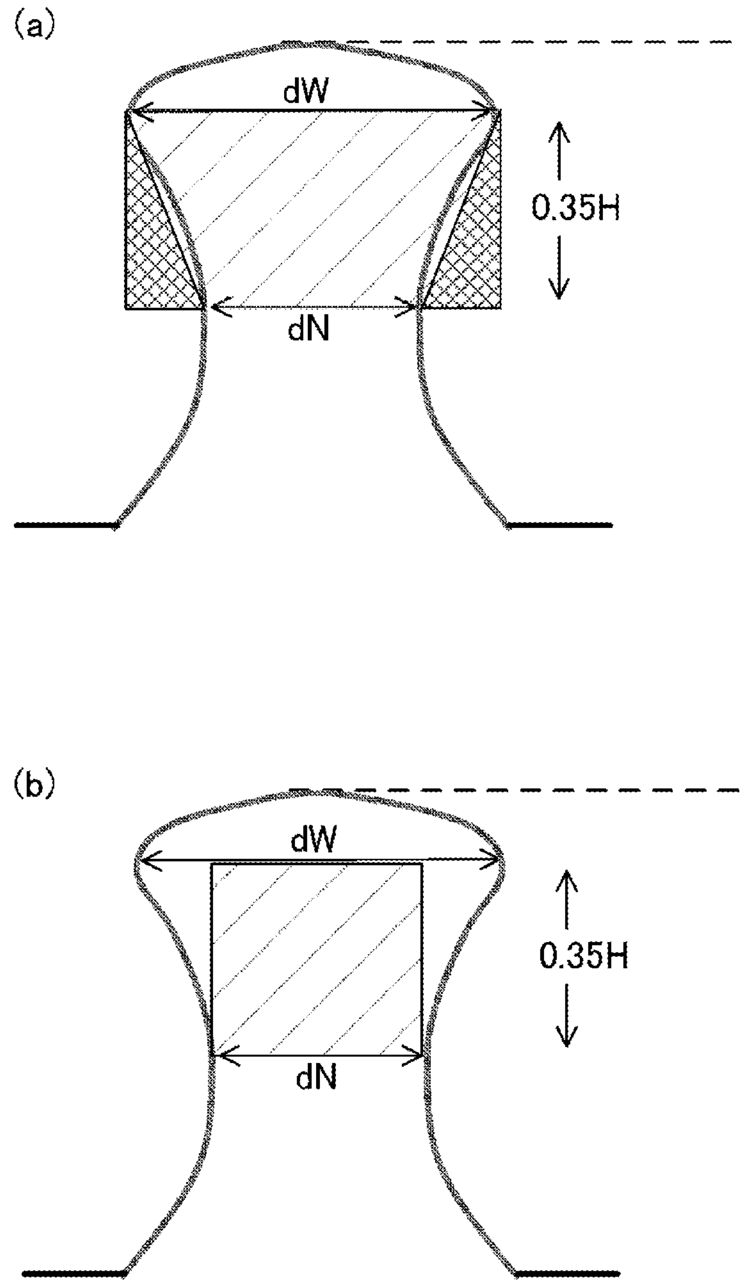

A section (a) of FIG. 3 is a diagram schematically illustrating a section of a constricted projection for describing Formula (I). A section (b) of FIG. 3 is a diagram schematically illustrating a section of a constricted projection for describing Formula (II).

Figure 4:
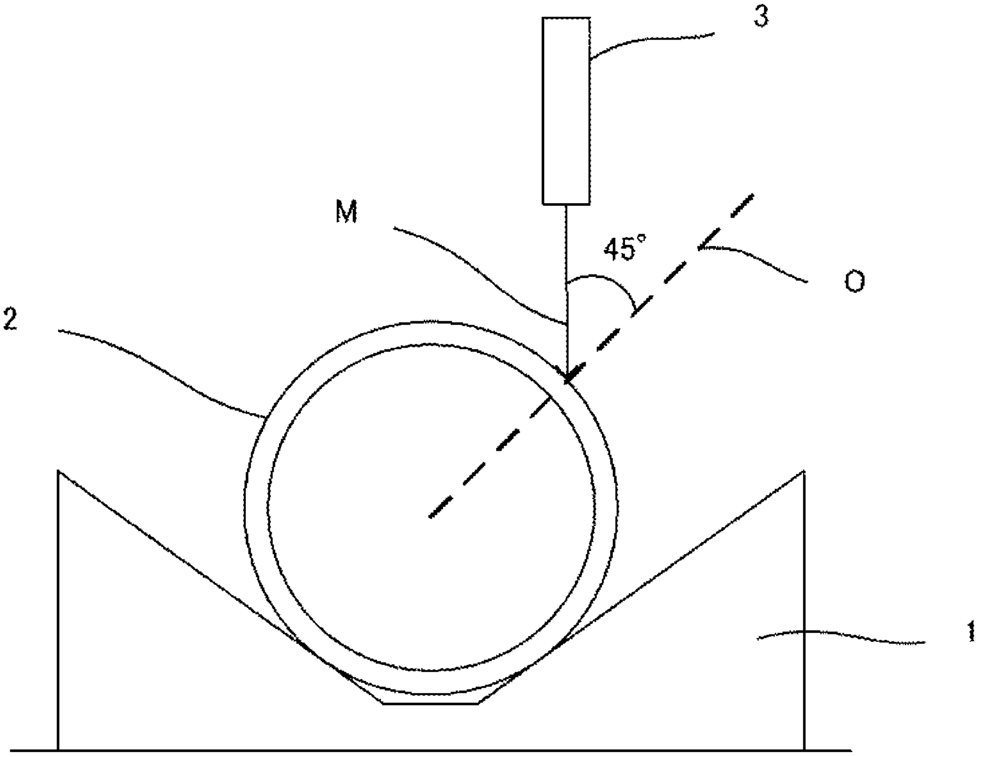

FIG. 4 is a schematic diagram illustrating an outline of observation of a projection with a microscope.

Figure 5:
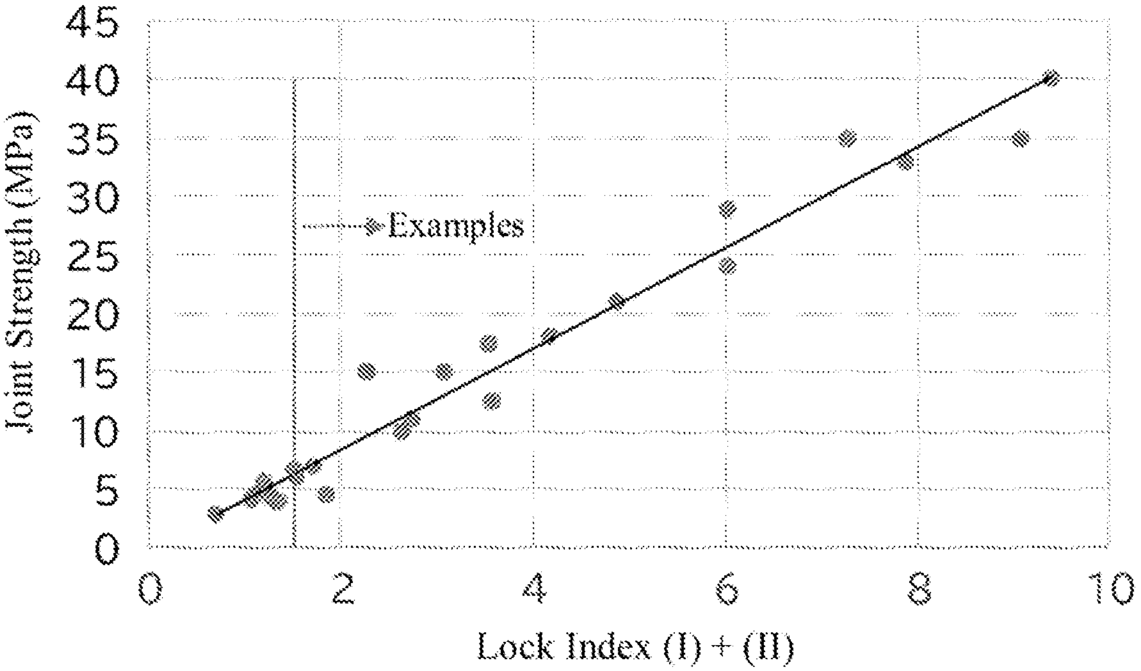

FIG. 5 is a graph plotted with the horizontal axis representing lock index (I)+(II) of cylindrical members according to Examples and Comparative Examples, and the vertical axis representing bonding strength when being joined to the outer peripheral member.

MODE FOR CARRYING OUT THE INVENTION

An embodiment of the present invention is a spiny liner including a plurality of projections including constricted projections on the surface. A cylinder liner including a plurality of projections on the surface is herein referred to as a spiny liner. A spiny liner may be used as a cylinder liner, a piston sliding through the cylinder bore of the cylinder liner in an internal combustion engine. The present inventors have focused on the shape of a projection included in a spiny liner and have found that a spiny liner having a new projection shape that may further improve bonding strength when the spiny liner is integrated with metal on its outer peripheral surface side is acquired by manufacturing the spiny liner by controlling the shape of the projection in consideration of strength of each projection itself, that is, the minimum thickness value of the projection, in addition to the difference between the maximum thickness and the minimum thickness of the projection.

Specifically, denoting the number of constricted projections per 100 $mm^2$ out of projections on the spiny liner surface by Pc, the average height of the projections by h (mm), and the average of maximum thicknesses and the average of minimum thicknesses of any 20 projections out of the constricted projections by dw (mm) and dn (mm), respectively, the spiny liner has the total value of (I) and (II) below being 1.55 or more.

$$(I)=Pc\times[(0.35h\pi/12)\times(2dw^2-dw\times dn-dn^2)]$$

$$(II)=Pc\times\{(dn^2/4)\times\pi\times0.35h\}$$

The aforementioned formulas will be described by use of drawings.

Figure 1:
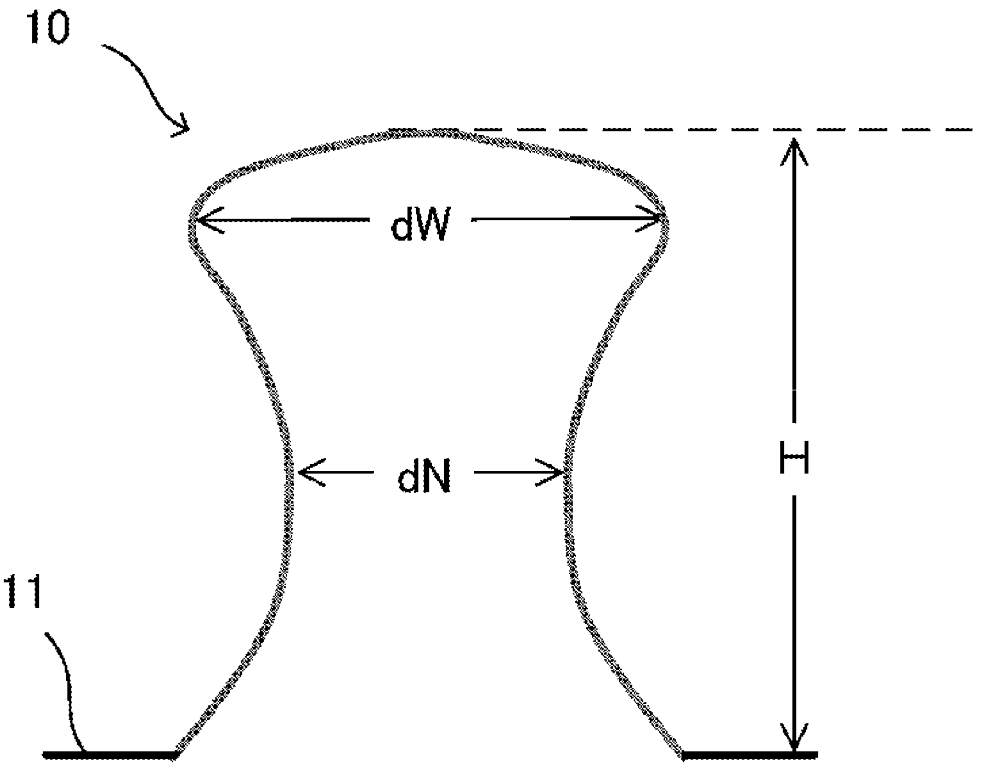
FIG. 1 is a diagram schematically illustrating a section of a constricted projection.

FIG. 1 is a diagram schematically illustrating a section of a constricted projection on the spiny liner surface. A projection 10 has a height H from a base surface 11 on the spiny liner outer periphery, and typically, the thickness of the projection gradually decreases from the base surface 11 toward a height direction and has a minimum thickness dN. Subsequently, the thickness gradually increases toward the height direction and reaches the maximum-diameter part. The thickness of the maximum-diameter part is referred to as a maximum thickness dW. Thus, a projection having the minimum thickness dN and the maximum thickness dW in this order from the base surface 11 toward the height direction is herein defined as a constricted projection.

Figure 2:
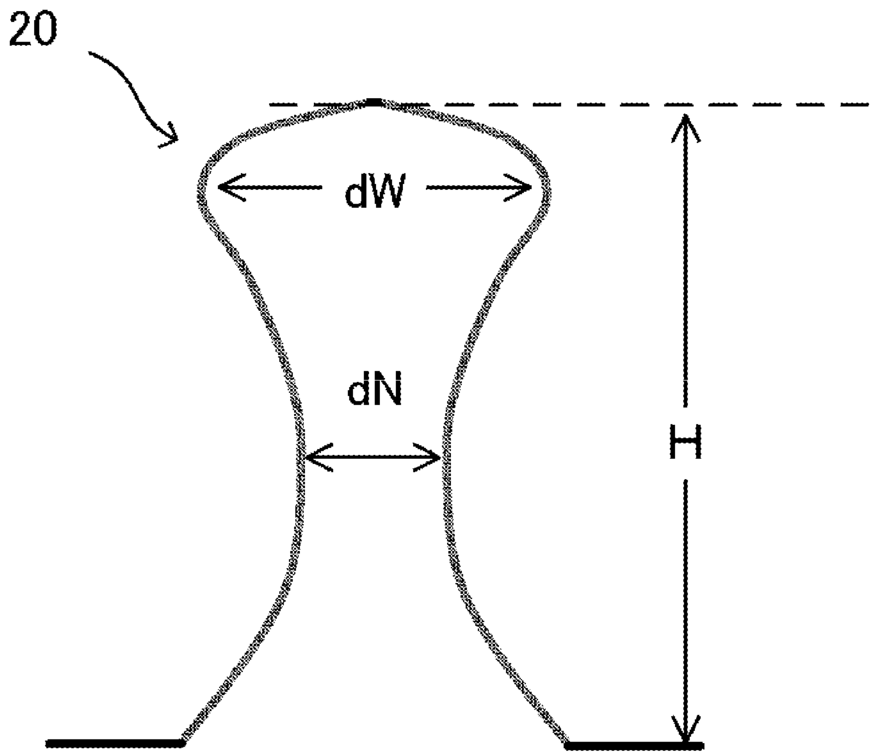
FIG. 2 is a diagram schematically illustrating a section of a constricted projection according to another embodiment.

The present inventors have examined the shape of a projection in more detail for improvement of bonding strength when metal on the outer peripheral side such as a cylinder block or the like, and a spiny liner are integrated and have arrived at controlling the shape of the projection in consideration of strength of each projection, that is, the minimum thickness value of the projection, in addition to the difference between the maximum thickness and the minimum thickness of the projection. Specifically, while the shape of the constricted projection 10 in the example in FIG. 1 and the shape of a constricted projection 20 in an example in FIG. 2 are considered to have almost similar amounts of constriction, that is, values of (dW−dN), the constricted projections have different bonding strength values when metal on the outer peripheral side and the spiny liner are integrated. The reason is that the numerical value of dN also greatly contributes to bonding strength when the metal on the outer peripheral side and the spiny liner are integrated. Therefore, it is required to control a projection shape in consideration of the dN value as well.

Aforementioned Formula (I) represents a degree of locking of a constriction of a projection into metal on the outer peripheral side. Specifically, when the value of aforementioned Formula (I) is small, the spiny liner and the metal on the outer peripheral side tend to be susceptible to disengagement. Specifically, Formula (I) represents the volume of a cross-hatched region in a section (a) in FIG. 3 and is calculated by subtracting the volume of a trapezoidal cylinder (a section of which is hatched in the diagram) with an upper base of dN, a lower base of dW, and a height of 0.35 H from the volume of a column with a diameter of dW and a height of 0.35 H. Note that the present inventors have found that the distance between the maximum thickness dW and the minimum thickness dN of a projection is 0.35 H on average.

Aforementioned Formula (II) represents strength of a projection itself. Specifically, when the value of aforementioned Formula (II) is small, strength of a projection itself of a spiny liner tends to decline, and when an intense shear force or tensile force is generated between the spiny liner and metal on the outer peripheral side, bonding strength tends to decline due to a break in the projection. Specifically, Formula (II) is the volume of a hatched region in a section (b) in FIG. 3 and is the volume of a column with a radius of dN and a height of 0.35 H.

Note that the average of maximum thicknesses (dW) of any 20 projections out of constricted projections is denoted by dw (mm), and the average of minimum thicknesses (dN) of any 20 projections out of the constricted projections is denoted by dn (mm).

Then, the total value of aforementioned (I) and (II) is defined as a lock index, and a spiny liner that may further improve bonding strength when being integrated with metal on the outer peripheral side can be provided by the lock index being equal to or greater than a certain value, that is, 1.55 or more. The lock index is preferably 1.70 or more and more preferably 2.0 or more.

The (I) value is preferably 0.25 or more, and the (II) value is preferably 1.35 or more.

An amount of constriction represented by dw−dn is preferably 0.08 or more and more preferably 0.1 or more and is preferably 0.4 or less and more preferably 0.35 or less in the present embodiment. By the amount of constriction represented by dw−dn falling in the aforementioned range, the constriction of the projection firmly locks into metal on the outer peripheral side, and bonding strength between the spiny liner and the metal on the outer peripheral side is improved.

Further, dw/dn is preferably 1.18 or more and more preferably 1.2 or more and is preferably 1.6 or less and more preferably 1.5 or less. By dw/dn falling in the aforementioned range, the constriction of the projection firmly locks into the metal on the outer peripheral side, and bonding strength between the spiny liner and the metal on the outer peripheral side is improved.

The number Pc of constricted projections per 100 $mm^2$ out of projections on a spiny liner surface is normally 10 or more, may be 20 or more or, 30 or more, is normally 130 or less and may be 100 or less, or 80 or less. The number Pc may be 10 or more and 40 or less in one embodiment, 30 or more and 50 or less in another embodiment, 40 or more and 80 or less in another embodiment, and 70 or more and 130 or less in another embodiment.

The average height h (mm) of projections on the spiny liner surface may normally be 0.3 or more or 0.4 or more and may normally be 1.0 or less or 0.9 or less. The average height h may be 0.3 or more and less than 0.6, 0.3 or more and 0.55 or less, 0.3 or more and less than 0.5, or 0.3 or more and 0.5 or less in one embodiment and may be 0.6 or more and 1.0 or less, or 0.6 or more and 0.8 or less in another embodiment.

The average dw (mm) of maximum thicknesses of any 20 projections out of constricted projections may normally be 0.4 or more, 0.5 or more, or 0.6 or more. Further, the average dw may normally be 1.3 or less, 1.2 or less, or may be 1.0 or less. The average dw may be 0.6 or more and 1.0 or less, 0.5 or more and 0.9 or less, or 0.4 or more and 0.8 or less in one embodiment.

The average dn (mm) of minimum thicknesses of any 20 projections out of constricted projections may normally be 0.25 or more, 0.3 or more, or 0.4 or more. Further, the average dn may normally be 1.2 or less, 1.0 or less, or 0.8 or less. The average dn may be 0.4 or more and 0.8 or less, 0.3 or more and 0.7 or less, or 0.2 or more and 0.6 or less in one embodiment.

A constriction rate Pr being a ratio of the number of constricted projections to the total number of projections Pn per 100 $mm^2$ with respect to projections on the spiny liner surface is normally 0.5 or more and may be 0.6 or more, 0.7 or more, 0.8 or more, 0.9 or more, 0.92 or more, 0.94 or more, 0.95 or more, 0.96 or more, 0.97 or more, 0.98 or more, or 0.99 or more.

A constricted-shape projection can be determined by observation with a microscope. More specifically, a projection on the outer peripheral surface of a spiny liner is observed from an angle forming approximately 45° with respect to a line passing through the central point of the cylindrical member and a measurement point on the outer peripheral surface and extending beyond. The maximum thickness dW and the minimum thickness dN of the projection can be measured by changing the observation angle and the focus. Note that the thickness of a projection referred to here can be also reworded as the width of an observed projection. The observation method will be more specifically described by use of FIG. 4.

As illustrated in FIG. 4, a spiny liner 2 for evaluation is placed on a block base 1. A microscope 3 connected to a TV monitor (unillustrated) is placed diagonally above the spiny liner 2 for evaluation in such a way that the optical axis M of the microscope 3 is parallel to the vertical direction. A projection formed on the surface of the spiny liner 2 under measurement is observed in such a way that the optical axis M of the microscope 3 and a line O passing through the central point of the measured spiny liner 2 and the measurement point on the outer peripheral surface and extending beyond form an angle of approximately 45°; and the angle and the focus are adjusted to facilitate the observation.

The spiny liner according to the present embodiment forms a complex structure of the spiny liner and metal on the outer peripheral side of the spiny liner by at least part of the outer peripheral surface of the spiny liner being covered by the metal and is put to various uses as a complex structure. The complex structure is preferably a complex structure in which the spiny liner is insert-cast by the metal on the outer peripheral side.

While the metal on the outer peripheral side constituting a complex is not particularly limited, a material solidified by cooling from a high-temperature state, a liquid material hardened by a polymerization reaction, a powdered material fused or sintered by heating, or the like can be used. Typical examples of the metal include molten metal using an aluminum alloy.

An example of a method of manufacturing the spiny liner according to the present embodiment will be described below. The spiny liner is typically a cast-iron member.

The composition of cast iron being a material of the spiny liner is not particularly limited. Typically, a composition described below can be exemplified as a composition of JIS FC250 equivalent flake graphite cast iron considering abrasion resistance, seizure resistance, and processability.

C: 3.0 to 3.7% by mass
Si: 2.0 to 2.8% by mass
Mn: 0.5 to 1.0% by mass
P: 0.25% by mass or less
S: 0.15% by mass or less
Cr: 0.5% by mass or less
Remainder: Fe and unavoidable impurities The method of manufacturing cast-iron spiny liner is not particularly limited but preferably uses centrifugal casting and typically includes the following processes A to E.

Process A: Suspension Preparation Process

The process A is a process of preparing a suspension by combining a fireproof base material, a binder, and water at a predetermined ratio.

Diatomite is typically used as a fireproof base material but the material is not limited thereto. The diatomite content of a suspension is normally 62% or more and 91% or less by mass, and the average particle diameter of diatomite is normally 3 μm or more and 40 μm or less.

Bentonite is typically used as a binder but the binder is not limited thereto. The liquid temperature of a suspension is preferably 35° C. or less, more preferably 25° C. or less, and yet more preferably 15° C. or less. The bentonite content of a suspension is normally 9% or more and 38% or less by mass.

Process B: Coating Agent Preparation Process

The process B is a process of preparing a coating agent by adding a predetermined amount of surface active agent to the suspension prepared in the process A.

The surface active agent type is not particularly limited, and a known surface active agent is used. An amount of surface active agent to be combined is normally 0.01% or more and 0.22% or less by mass.

Process C: Coating Agent Coating Process

The process C is a process of applying the coating agent to the inner peripheral surface of a cylindrical metal mold to be a casting mold. The coating method is not particularly limited but spray coating is typically used. When the coating agent is applied, it is preferable to apply the coating agent in such a way that a coating agent layer is formed over the entire inner peripheral surface in almost uniform thickness. Further, when the coating agent layer is formed by applying the coating agent, it is preferable to give a suitable centrifugal force by rotating the cylindrical metal mold.

The present inventors presume that the manufacture of a projection existing on the outer peripheral surface of the spiny liner is formed through the following process.

Specifically, moisture in the coating agent in the coating agent layer formed on the inner peripheral surface of the casting mold heated to a predetermined temperature rapidly evaporates, and air bubbles are generated. Then, a concave hole is formed on the inner peripheral side of the coating agent layer by the surface active agent acting on relatively large-sized air bubbles and relatively small-sized air bubbles combining with one another. In a process of the coating agent layer drying and the coating agent layer forming a concave hole gradually solidifying, a concave hole having a constricted shape is formed in the coating agent layer.

The thickness of the coating agent layer is preferably selected in a range of the height of the projection multiplied by 1.1 to 2.0 but is not limited thereto. When the thickness of the coating agent layer falls in the aforementioned range, it is preferable that the temperature of the cylindrical metal mold be 150° C. or more and 350° C. or less.

Process D: Cast Iron Casting Process

The process D is a process of casting cast iron into the casting mold including the dry coating agent layer and being in a rotation state. At this time, by molten metal filled into the constricted-shape concave hole in the coating agent layer, the hole being described in the previous process, a constricted projection is formed on the surface of the spiny liner. It is preferable that a suitable centrifugal force be given at this time as well.

Process E: Takeout and Finishing Process

In the process E, the spiny liner is completed by taking out the manufactured spiny liner from the casting mold and removing the coating agent layer on the spiny liner surface from the spiny liner by abrasive blasting. The value of the average dw of maximum thicknesses can be adjusted by adjusting abrasive blasting time.

While the spiny liner is completed through the processes described above, many constricted projections need to be manufactured in order for projections on the spiny liner surface to satisfy aforementioned Formulas (I) and (II). For this purpose, an amount of water in the process A, an amount of surface active agent in the process B, the thickness of the coating agent layer, Gno in coating agent layer formation, Gno in cast iron casting, and the like need to be appropriately adjusted. Specifically, the shape of a projection on the spiny liner surface can be more easily kept in a specific range by satisfying the following conditions as an example.

Amount of added surface active agent in the process B: 0.01% by mass to 0.22% by mass Thickness of the coating agent layer: 0.5 mm to 1.1 mm Gno (lining): 30G to 120G Gno (casting): 50G to 160G Note that Gno (lining) denotes G (centrifugal force) generated when the cylindrical metal mold is rotated in formation of the coating agent layer in the aforementioned process C, and Gno (casting) denotes G (centrifugal force) generated in rotation of the casting mold in the aforementioned process D.

Another embodiment of the present invention is a determination method of applying knowledge about the shape of a projection on the surface of the spiny liner described above and determining, from the shape, bonding strength of a complex acquired by joining the spiny liner and metal on the outer peripheral surface side.

The determination method includes a determination step of determining whether the total value of (I) and (II) below (lock index) is 1.55 or more with respect to projections on the surface of the spiny liner.

Method of Calculating (I) and (II)

Denoting the number of constricted projections per 100 $mm^2$ by Pc, the average height of projections by h (mm), and the average of maximum thicknesses and the average of minimum thicknesses of any 20 projections out of the constricted projections by dw (mm) and dn (mm), respectively, the values of (I) and (II) are calculated.

$$(I)=Pc\times[(0.35h\pi/12)\times(2dw^2-dw\times dn-dn^2)]$$

$$(II)=Pc\times\{(dn^2/4)\times\pi\times 0.35h\}$$

Whether the aforementioned lock index is 1.70 or more may be determined, and whether the lock index is 2.0 or more may be determined.

Further, the determination step described above can determine that bonding strength of the complex acquired by joining the spiny liner and the metal on the outer peripheral surface side is high when the aforementioned lock index is 1.55 or more, preferably 1.70 or more, and more preferably 2.0 or more.

Then, after performing the determination described above, a spiny liner having excellent joining power when being joined to metal on the outer peripheral surface side can be acquired by selecting a spiny liner having a lock index, that is, the total value of (I) and (II) of 1.55 or more in the determination step. In terms of selection of a spiny liner, a spiny liner having a lock index 1.70 or more may be selected, or a spiny liner having a lock index 2.0 or more may be selected.

Furthermore, another embodiment of the present invention is a spiny liner including projections on the surface and being given information about bonding strength of a complex acquired when the spiny liner and a cylinder block are joined. The information may be characters or may be electronic information using an ID chip or the like. Further, the information may be directly given to the spiny liner or may be provided on a packaging body of the spiny liner directly or through a medium. Examples of the medium include paper, a film-made label, and an electronic medium such as an IC chip. While the medium may be directly affixed to the spiny liner, the medium is preferably packaged with the spiny liner.

Examples

While the present invention will be described in detail below using Examples, the present invention is not limited to the following Examples.

A measurement method used in these Examples is as follows.

Total Number of Projections and Average Height of Projections

The number of projections and the average height of projections (hereinafter also simply referred to as "the height of projections") were measured by a 3D measuring instrument (VR-3000 series manufactured by KEYENCE) at a magnification of 25 and a measurement visual field range of 12 mm×9 mm. Curvature correction was performed on the measured data by analysis software attached to the VR-3000 series manufactured by KEYENCE. The correction condition was quadric surface correction. Next, a reference surface was set. The reference surface was automatically set by block definition. A threshold value was set to about ½ to ⅓ of the projection height and was set to 0.25 mm at the time of the measurement. A height region exceeding the threshold value was assumed to be a projection, and the number thereof was defined to be the number of projections. The number of projections was defined to be "the total number of projections existing in the visual field"−"the number of projections at least partially covering the boundary part of the visual field"½. The total number of projections Pn per unit area was determined from the measured number of projections and the visual field area.

The height of each projection was defined as the total value of a display range center+a threshold value+a maximum height. The display range center is a parameter set on the device side according to a property of a measured cylinder liner and represents the height from the base surface of the projection to the reference surface. The threshold value represents the height from the reference surface, and the maximum height represents the height from the display range center+the threshold value to the projection tip. The height of each projection can be measured by reading the maximum height of the projection, and the average height h of projections was determined from the average value of the height.

Since values of the height and the base surface of a projection vary with an observation direction due to the shape of the projection, a measurement direction is fixed to a direction arbitrarily determined at the time of measurement, and measurement was performed across the measurement visual field range.

The analysis was performed at four points for one cylinder liner, and the average value was determined. The four points were set as two points positioned approximately 20 mm apart from each of the two ends of the cylinder liner, the positions of the four points being shifted approximately 90° from each other at each end.

Constriction Rate, Maximum Thickness, and Minimum Thickness of Projection

By using a microscope (digital microscope KH-1300 manufactured by Hirox Co., Ltd.), projections were observed until the number of constricted projections reached 20. The constriction rate of projections was calculated from the number of observed projections. The number of constricted projections Pc per 100 $mm^2$ was determined from the total number of projections Pn per 100 $mm^2$ and the constriction rate. Further, the maximum thickness dW and the minimum thickness dN of any 20 constricted projections were determined, and the respective averages thereof are denoted by dw (mm) and dn (mm).

Since values of the maximum thickness and the minimum thickness vary with an observation direction due to the shape of the projection, a measurement direction is fixed to a direction arbitrarily determined at the time of measurement, and 20 samples in the measurement visual field range were measured. The maximum and minimum thicknesses were also measured at four points, and the average values thereof were determined.

Lock Index (I)+(II)

Using the values of Pc, h, dw, and dn measured as described above, the lock index (I)+(II) represented by the following formulas was calculated.

$$(I)=Pc\times[(0.35h\pi/12)\times(2dw^2-dw\times dn-dn^2)]$$

$$(II)=Pc\times\{(dn^2/4)\times\pi\times 0.35h\}$$

Bonding Strength

After joining a cylindrical member to an outer peripheral member (aluminum material) under a certain condition, a sample of the joint surface with a size of approximately 20 mm×20 mm was cut out. By use of a tensile testing machine (Universal Tester AG-5000E manufactured by Shimadzu Corporation), one of the cylindrical member and the outer peripheral member was fixed by a clamp, and tensile loading was applied to the other in a direction orthogonal to the joint surface of both members. Bonding strength was acquired by dividing tensile strength when both members were separated from each other by the joint area.

Examples/Comparative Examples

Production of Coating Agent

A coating agent was produced by use of raw materials listed in Table 1 below.

Preparation of Cast-Iron Cylindrical Member

A cast-iron cylindrical member for each Example and Comparative Example was prepared by centrifugal casting using molten metal with the same composition. The composition of the cast cast-iron cylindrical member was:

C: 3.4% by mass,

Si: 2.4% by mass,

Mn: 0.7% by mass,

P: 0.12% by mass,

S: 0.035% by mass,

Cr: 0.25% by mass, and

Remainder: Fe and unavoidable impurities Z (JIS FC250 equivalent).

Cylindrical members in Examples 1 to 16 and Comparative Examples 1 to 6 were produced by use of coating agents listed in Table 1. In every Example, the temperature of a cylindrical metal mold in the process C was set in a range from 150° C. to 350° C., and a coating agent layer was formed based on Gno (lining) listed in Table 1. However, the height of a projection was appropriately changed by appropriately changing the thickness of a coating agent layer in each Example. Further, the process D (cast iron casting process) and beyond were performed under the same condition in every Example except that casting of cast iron was performed based on Gno (casting) listed in Table 1. Subsequently, the inner peripheral surface of the acquired cast-iron cylindrical member was cut and the wall thickness was adjusted to 5.5 mm.

The dimensions of thus acquired cast-iron cylindrical member were an outer diameter (outer diameter including the height of the projection) of 85 mm, an inner diameter of 74 mm (wall thickness 5.5 mm), and a length in the axial direction of 130 mm. The result of measurement of shapes of projections performed on the produced cylindrical members is described in Table 2.

TABLE 1

| | Diatomite (% by mass) | Diatomite Average particle diameter (mm) | Bentonite (% by mass) | Surface active agent (% by mass) | Gno (lining) | Gno (casting) |
|---|---|---|---|---|---|---|
| Example 1 | 78.1 | 0.035 | 21.9 | 0.03 | 70 | 80 |
| Example 2 | 78.1 | 0.035 | 21.9 | 0.04 | 60 | 100 |
| Example 3 | 78.1 | 0.035 | 21.9 | 0.04 | 50 | 120 |
| Example 4 | 78.0 | 0.035 | 21.9 | 0.04 | 40 | 140 |
| Example 5 | 78.0 | 0.035 | 21.9 | 0.05 | 30 | 160 |
| Example 6 | 78.2 | 0.017 | 21.8 | 0.03 | 80 | 80 |
| Example 7 | 78.2 | 0.017 | 21.8 | 0.03 | 70 | 100 |
| Example 8 | 78.2 | 0.017 | 21.8 | 0.04 | 60 | 120 |
| Example 9 | 78.2 | 0.017 | 21.8 | 0.04 | 50 | 140 |
| Example 10 | 78.2 | 0.017 | 21.8 | 0.04 | 40 | 160 |
| Example 11 | 76.4 | 0.017 | 23.6 | 0.03 | 70 | 90 |
| Example 12 | 76.4 | 0.017 | 23.6 | 0.04 | 70 | 100 |
| Example 13 | 76.4 | 0.017 | 23.6 | 0.04 | 60 | 120 |
| Example 14 | 76.4 | 0.017 | 23.6 | 0.05 | 80 | 100 |
| Example 15 | 76.4 | 0.017 | 23.6 | 0.04 | 70 | 140 |
| Example 16 | 76.4 | 0.035 | 23.6 | 0.04 | 100 | 60 |
| Comparative Example 1 | 78.1 | 0.035 | 21.9 | 0.02 | 80 | 60 |
| Comparative Example 2 | 78.2 | 0.017 | 21.8 | 0.02 | 90 | 60 |
| Comparative Example 3 | 76.4 | 0.017 | 23.6 | 0.03 | 90 | 90 |
| Comparative Example 4 | 76.4 | 0.017 | 23.6 | 0.04 | 100 | 80 |
| Comparative Example 5 | 76.4 | 0.017 | 23.6 | 0.04 | 80 | 50 |
| Comparative Example 6 | 76.4 | 0.017 | 23.6 | 0.05 | 120 | 60 |

TABLE 2

| | Average height h (mm) | Number of constricted projections Pc (/100 $mm^2$) | dw (mm) | dn (mm) | dw/dn | (I) | (II) | (I) + (II) |
|---|---|---|---|---|---|---|---|---|
| Example 1 | 0.74 | 25.5 | 0.72 | 0.60 | 1.20 | 0.42 | 1.83 | 2.25 |
| Example 2 | 0.71 | 35.3 | 0.92 | 0.75 | 1.23 | 1.03 | 3.81 | 4.84 |
| Example 3 | 0.73 | 38.7 | 1.00 | 0.73 | 1.36 | 0.87 | 4.21 | 4.21 |
| Example 4 | 0.75 | 45.1 | 1.02 | 0.70 | 1.46 | 2.70 | 4.56 | 4.56 |
| Example 5 | 0.72 | 49.6 | 1.12 | 0.79 | 1.42 | 3.30 | 6.18 | 6.18 |
| Example 6 | 0.52 | 51.2 | 0.63 | 0.57 | 1.11 | 0.29 | 2.36 | 2.64 |
| Example 7 | 0.55 | 67.8 | 0.70 | 0.57 | 1.22 | 0.85 | 3.34 | 4.19 |
| Example 8 | 0.53 | 88.1 | 0.75 | 0.60 | 1.25 | 1.38 | 4.64 | 6.02 |
| Example 9 | 0.54 | 102.1 | 0.80 | 0.62 | 1.29 | 2.01 | 5.86 | 7.87 |
| Example 10 | 0.53 | 108.3 | 0.85 | 0.65 | 1.30 | 2.37 | 6.69 | 9.06 |
| Example 11 | 0.47 | 27.1 | 0.76 | 0.64 | 1.20 | 0.32 | 1.42 | 1.73 |
| Example 12 | 0.44 | 46.2 | 0.76 | 0.63 | 1.21 | 0.54 | 2.20 | 2.74 |
| Example 13 | 0.48 | 44.0 | 0.81 | 0.62 | 1.30 | 0.82 | 2.27 | 3.09 |
| Example 14 | 0.46 | 72.4 | 0.67 | 0.57 | 1.19 | 0.62 | 2.94 | 3.55 |
| Example 15 | 0.47 | 59.6 | 0.76 | 0.57 | 1.35 | 1.06 | 2.50 | 3.56 |
| Example 16 | 0.61 | 29.7 | 0.66 | 0.41 | 1.61 | 0.72 | 0.84 | 1.56 |
| Comparative Example 1 | 0.77 | 22.3 | 0.56 | 0.50 | 1.12 | 0.15 | 1.14 | 1.33 |
| Comparative Example 2 | 0.52 | 27.7 | 0.58 | 0.48 | 1.19 | 0.21 | 0.93 | 1.14 |
| Comparative Example 3 | 0.49 | 28.8 | 0.62 | 0.54 | 1.15 | 0.18 | 1.10 | 1.28 |
| Comparative Example 4 | 0.49 | 39.2 | 0.53 | 0.49 | 1.08 | 0.10 | 1.26 | 1.36 |
| Comparative Example 5 | 0.58 | 18.3 | 0.62 | 0.59 | 1.04 | 0.04 | 1.02 | 1.07 |
| Comparative Example 6 | 0.45 | 32.3 | 0.50 | 0.30 | 1.67 | 0.35 | 0.36 | 0.71 |

Each of the cylindrical members in Examples 1 to 16 and Comparative Examples 1 to 6 was formed into a complex by being joined with an outer peripheral member (aluminum material) under a certain condition. Bonding strength of each complex was measured and is illustrated in FIG. 5.

As is apparent from FIG. 5, it is understood that a complex of a spiny liner and an outer peripheral member having a lock index (I)+(II) of 1.55 or more has excellent bonding strength.

DESCRIPTION OF SYMBOLS

1: block base
2: spiny liner
3: microscope
10, 20: constricted projection
11: base surface of spiny liner

The invention claimed is:

1. A spiny liner comprising a plurality of projections including one or a plurality of constricted projections on a surface, wherein the spiny liner is produced using a coating agent comprising a surface active agent 0.03% or more by mass and a diatomite 62% or more and 91% or less by mass, denoting the number of constricted projections per 100 $mm^2$ out of the projections by Pc, an average height of projections by h (mm), and an average of maximum thicknesses and an average of minimum thicknesses of any 20 projections out of the constricted projections by dw (mm) and dn (mm), respectively, Pc is 30 or more, dw−dn is 0.08 mm or more, and a total value of (I) and (II) below is 1.55 or more:

$$(I)=Pc\times[(0.35h\pi/12)\times(2dw^2-dw\times dn-dn^2)]$$

$$(II)=Pc\times\{(dn^2/4)\times\pi\times0.35h\}.$$

2. The spiny liner according to claim 1, wherein a value of dw/dn is 1.1 or more and 1.6 or less.

3. The spiny liner according to claim 1, wherein a value of (I) is 0.25 or more.

4. The spiny liner according to claim 1, wherein a value of (II) is 1.35 or more.

5. A method of manufacturing a spiny liner, wherein the method comprises:

a preparation step of preparing a spiny liner;

a determination step of determining bonding strength of a prepared spiny liner by a method comprising a plurality of projections including one or a plurality of constricted projections on a surface, wherein the spiny liner is produced using a coating agent comprising a surface active agent 0.03% or more by mass and a diatomite 62% or more and 91% or less by mass, denoting the number of constricted projections per 100 $mm^2$ out of the projections by Pc, an average height of projections by h (mm), and an average of maximum thicknesses and an average of minimum thicknesses of any 20 projections out of the constricted projections by dw (mm) and dn (mm), respectively, Pc is 30 or more, dw−dn is 0.08 mm or more, and a total value of (I) and (II) below is 1.55 or more:

$$(I)=Pc\times[(0.35h\pi/12)\times(2dw^2-dw\times dn-dn^2)]$$

$$(II)=Pc\times\{(dn^2/4)\times\pi\times0.35h\};\text{ and}$$

a selection step of selecting a spiny liner having a total value of (I) and (II) in a determination step being 1.55 or more.

6. A spiny liner comprising one or a plurality of projections on a surface, wherein the spiny liner is given information about bonding strength of a complex acquired when the spiny liner is joined to a cylinder block, and the information is a total of the (I) and (II) values determined by a method comprising a plurality of projections including one or a plurality of constricted projections on a surface, wherein the spiny liner is produced using a coating agent comprising a surface active agent 0.03% or more by mass and a diatomite 62% or more and 91% or less by mass, denoting the number of constricted projections per 100 $mm^2$ out of the projections by Pc, an average height of projections by h (mm), and an average of maximum thicknesses and an average of minimum thicknesses of any 20 projections out of the constricted projections by dw (mm) and dn (mm), respectively, Pc is 30 or more, dw−dn is 0.08 mm or more, and a total value of (I) and (II) below is 1.55 or more:

$$(I)=Pc\times[(0.35h\pi/12)\times(2dw^2-dw\times dn-dn^2)]$$

$$(II)=Pc\times\{(dn^2/4)\times\pi\times0.35h\}.$$

7. The spiny liner according to claim 6, wherein the information is directly given to a spiny liner, provided on a packaging body of a spiny liner directly or through a medium, or provided by a medium packaged with a spiny liner.

* * * * *